US011529871B2

(12) United States Patent
Suzuki et al.

(10) Patent No.: US 11,529,871 B2
(45) Date of Patent: Dec. 20, 2022

(54) CONTROL DEVICE, CONTROL METHOD, AND NON-TRANSITORY COMPUTER-READABLE STORAGE MEDIUM (71) Applicant: HONDA MOTOR CO., LTD., Tokyo (JP)

(72) Inventors: Noriaki Suzuki, Wako (JP); Yosuke Mizutani, Wako (JP); Masaaki Abe, Wako (JP); Masaru Aoki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 467 days.

(21) Appl. No.: 16/565,879

(22) Filed: Sep. 10, 2019

(65) Prior Publication Data
US 2020/0101843 A1 Apr. 2, 2020

(30) Foreign Application Priority Data

Sep. 28, 2018 (JP) .............................. JP2018-184940

(51) Int. Cl.
*B60K 35/00* (2006.01)
*B60T 8/17* (2006.01)
*B60L 7/10* (2006.01)

(52) U.S. Cl.
CPC ................ *B60K 35/00* (2013.01); *B60T 8/17* (2013.01); *B60K 2370/167* (2019.05); *B60L 7/10* (2013.01)

(58) Field of Classification Search
CPC .............. B60K 35/00; B60K 2370/152; B60K 2370/167; B60W 30/18127; B60L 15/2009; B60L 15/2045; B60L 7/26; B60L 2250/16; B60L 7/10; B60T 2270/604; B60T 8/17; Y02T 10/72; Y02T 10/64
See application file for complete search history.

(56) References Cited

U.S. PATENT DOCUMENTS 6,179,390 B1 * 1/2001 Guzorek ............... B60T 17/221
                                                                188/3 R
7,898,405 B2    3/2011 Burke et al.
8,855,880 B2   10/2014 Rowker et al.
9,421,962 B2    8/2016 Rowker et al.
9,718,359 B2    8/2017 Crombez et al.
10,688,871 B2   6/2020 Shimizu et al.
(Continued)

FOREIGN PATENT DOCUMENTS

CN       101823438 A      9/2010
CN       102963348 A      3/2013
(Continued)

OTHER PUBLICATIONS

Japanese Office Action issued for Japanese Patent Application No. 2018-184940 dated Jul. 6, 2020.
(Continued)

*Primary Examiner* — Behrang Badii
(74) *Attorney, Agent, or Firm* — Thomas|Horsetmyer, LLP (57) ABSTRACT A control device configured to control a vehicle is provided. The device comprises a traveling control unit configured to set an effect degree of a braking force to be given to the vehicle, and an output control unit capable of displaying, on a display device of the vehicle, an indicator representing an upper limit of a settable level of the effect degree.

9 Claims, 3 Drawing Sheets (56) References Cited

U.S. PATENT DOCUMENTS

| | | | |
|---|---|---|---|
| 2004/0155523 A1* | 8/2004 | Frentz | B60T 8/326 |
| | | | 303/155 |
| 2006/0290202 A1* | 12/2006 | Shibata | B60T 7/22 |
| | | | 303/165 |
| 2007/0018499 A1* | 1/2007 | Kokubo | B60L 7/14 |
| | | | 303/151 |
| 2009/0243827 A1 | 10/2009 | Burke et al. | |
| 2011/0082632 A1 | 4/2011 | Rowker et al. | |
| 2012/0053804 A1* | 3/2012 | Saida | B60L 7/10 |
| | | | 701/70 |
| 2013/0049945 A1 | 2/2013 | Crombez et al. | |
| 2014/0365096 A1* | 12/2014 | Cooper | B60T 17/228 |
| | | | 701/70 |
| 2015/0012173 A1 | 1/2015 | Rowker et al. | |
| 2018/0201140 A1* | 7/2018 | Shimizu | B60T 1/10 |
| 2021/0162869 A1* | 6/2021 | Nakamura | B60W 30/18127 |

FOREIGN PATENT DOCUMENTS

| | | |
|---|---|---|
| CN | 108430823 A | 8/2018 |
| EP | 3437934 A1 | 2/2019 |
| JP | 2009189074 A | 8/2009 |
| JP | 2013201840 A | 10/2013 |
| JP | 2014201125 A | 10/2014 |
| JP | 2017-073886 A | 4/2017 |
| JP | 2017-175739 A | 9/2017 |
| WO | 2017169239 A1 | 10/2017 |

OTHER PUBLICATIONS

Chinese Office Action issued for Chinese Patent Application No. 201910849616.9 dated Aug. 18, 2022.

* cited by examiner

CONTROL DEVICE, CONTROL METHOD, AND NON-TRANSITORY COMPUTER-READABLE STORAGE MEDIUM

CROSS-REFERENCE TO RELATED APPLICATION(S)

This application claims priority to and the benefit of Japanese Patent Application No. 2018-184940 filed on Sep. 28, 2018, the entire disclosure of which is incorporated herein by reference.

BACKGROUND OF THE INVENTION

Field of the Invention

The present invention relates to a control device, a control method, and a non-transitory computer-readable storage medium.

Description of the Related Art

In an electric vehicle, a braking force is given to the vehicle by a regeneration brake. Japanese Patent Laid-Open No. 2017-73886 proposes a control device capable of causing a driver to set the level (effect degree) of a regeneration brake. This control device displays the current level of the regeneration brake on a display device. In addition, if the regeneration brake cannot be set to the level instructed by the driver, the driver is notified of it.

SUMMARY OF THE INVENTION

The maximum level of the regeneration brake settable by the driver changes depending on the vehicle state (for example, the charge state of a battery), or the like. Since the control device of Japanese Patent Laid-Open No. 2017-73886 only displays the current level of the regeneration brake, it is impossible to grasp the degree to strengthen the regeneration brake by the driver. The same problem arises even in another control device that allows the driver to adjust not only the level of the regeneration brake but also the level of the braking force. An aspect of the present invention provides a technique of allowing a driver to grasp the settable level of a braking force.

In consideration of the above-described problem, a control device configured to control a vehicle is provided. The device comprises a traveling control unit configured to set an effect degree of a braking force to be given to the vehicle, and an output control unit capable of displaying, on a display device of the vehicle, an indicator representing an upper limit of a settable level of the effect degree.

DESCRIPTION OF THE EMBODIMENTS

Embodiments of the present invention will now be described with reference to the accompanying drawings. The same reference numerals denote similar elements throughout various embodiments, and a repetitive description will be omitted. In addition, the embodiments can appropriately be changed or combined.

An example of the arrangement of a vehicle 100 according to some embodiments of the present invention will be described with reference to FIG. 1. The vehicle 100 is a vehicle (so-called hybrid vehicle) using both a fossil fuel and electricity as a driving power source. The vehicle 100 may be a vehicle (so-called engine vehicle or diesel vehicle) using only a fossil fuel as the driving power source, or may be a vehicle (so-called electric vehicle) using only electricity as the driving power source or a vehicle (so-called fuel cell vehicle) using hydrogen as the driving power source.

Figure 1:
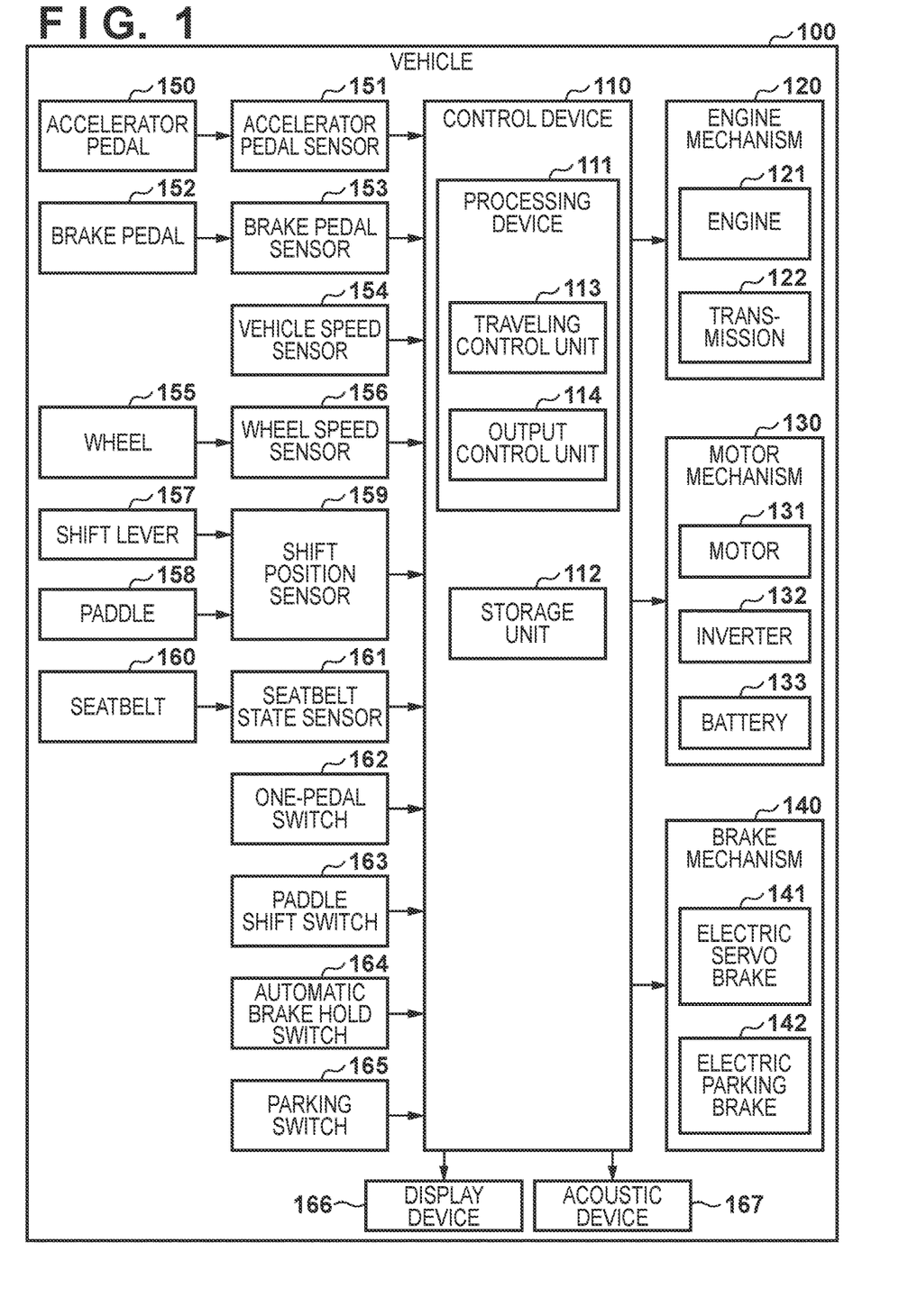
FIG. 1 is a block diagram for explaining an example of the arrangement of a vehicle according to an embodiment of the present invention.

The vehicle 100 includes constituent elements shown in FIG. 1. FIG. 1 mainly shows constituent elements used for the description of the embodiment, and other constituent elements (for example, a vehicle body, a suspension, and the like) of the vehicle 100 are not illustrated. A control device 110 controls the vehicle 100. The control device 110 may be formed as a general-purpose computer including a processing unit 111 and a storage unit 112. The processing unit 111 performs processing for controlling the vehicle 100. The processing unit 111 is formed by, for example, a processor. The storage unit 112 stores programs and data used in the processing by the processing unit 111. The storage unit 112 is formed by, for example, a volatile memory such as a RAM (Random Access Memory) and a nonvolatile memory such as a ROM (Read Only Memory).

The processing unit 111 includes, for example, a traveling control unit 113 and an output control unit 114. The traveling control unit 113 performs control concerning driving and braking of the vehicle 100. The output control unit 114 performs control concerning output of information to a driver. When the processing unit 111 executes a program stored in the storage unit 112, operations by the traveling control unit 113 and the output control unit 114 are performed. The control device 110 may be formed not by a general-purpose computer but by a dedicated integrated circuit (for example, ASIC). In this case, the traveling control unit 113 and the output control unit 114 may be formed by separate integrated circuits.

The control device 110 can also be called an ECU (Electronic Control Unit). The control device 110 may be formed by one ECU or may be formed by a plurality of ECUs. If the control device 110 is formed by a plurality of ECUs, these ECUs are arranged on various places in the vehicle and communicate with each other via an in-vehicle network such as a CAN (Controller Area Network).

An engine mechanism 120 gives a driving force to the vehicle 100 using a fossil fuel (for example, gasoline) as an energy source. The engine mechanism 120 includes an engine 121 and a transmission 122. The engine 121 is the driving source of the vehicle 100 and is controlled by the traveling control unit 113. The transmission 122 is, for example, a CVT (Continuously Variable Transmission). Alternatively, another transmission may be used. The traveling control unit 113 controls the engine mechanism 120, thereby making an engine brake actuate.

A motor mechanism 130 gives a driving force to the vehicle 100 using electricity as an energy source. The motor mechanism 130 includes a motor 131, an inverter 132, and a battery 133. The inverter 132 controls the output of the motor 131. The battery 133 accumulates electric energy and supplies the electric energy to the motor 131 via the inverter 132. The traveling control unit 113 controls the motor mechanism 130, thereby making a regeneration brake actuate.

The brake mechanism 140 gives a braking force to the vehicle 100. The brake mechanism 140 includes an electric servo brake 141 and an electric parking brake 142. The electric servo brake 141 is a brake that makes the regeneration brake by the motor cooperate with a friction brake by a liquid pressure, and gives a braking force according to the operation amount of a brake pedal 152 to the vehicle 100. The electric parking brake 142 gives a stop hold braking force independent of the operation amount of the brake pedal 152 to the rear wheels of the vehicle 100.

An accelerator pedal 150 is a pedal used to receive control of the driving force from the driver. An accelerator pedal sensor 151 detects the depression amount (to be also referred to as an AP operation amount hereinafter) of the accelerator pedal 150, and supplies it to the control device 110. The traveling control unit 113 controls the engine mechanism 120 and the motor mechanism 130 to give a driving force according to the AP operation amount to the vehicle 100.

The brake pedal 152 is a pedal used to receive control of the braking force from the driver. A brake pedal sensor 153 detects the depression amount (to be also referred to as a BP operation amount hereinafter) of the brake pedal 152, and supplies it to the control device 110. The traveling control unit 113 controls the electric servo brake 141 to give a braking force according to the BP operation amount to the vehicle 100.

Figure 6:
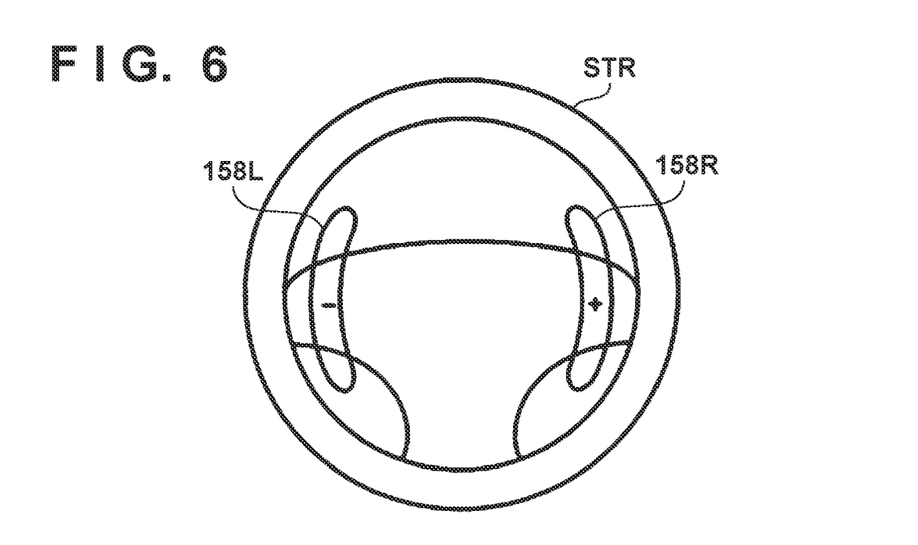
FIG. 6 is a schematic view for explaining the position of a paddle according to the embodiment of the present invention.

A vehicle speed sensor 154 detects the vehicle speed of the vehicle 100, and supplies it to the control device 110. A wheel speed sensor 156 detects the rotation speed of a wheel 155, and supplies it to the control device 110. A shift position sensor 159 detects the position of a shift lever 157, and supplies it to the control device 110. In addition, the shift position sensor 159 detects an input using a paddle 158, and supplies it to the control device 110. The input using the paddle 158 includes a shift down instruction and a shift up instruction. For example, as shown in FIG. 6, the paddle 158 is provided as a right paddle 158R and a left paddle 158L on the periphery of a steering STR. The right paddle 158R is used for a shift up instruction. The left paddle 158L is used for a shift down instruction. A seatbelt state sensor 161 detects the attachment state of a seatbelt 160, and supplies it to the control device 110.

The traveling control unit 113 may be able to execute a one-pedal function. The one-pedal function is a function of controlling both the driving force and the braking force of the vehicle 100 in accordance with the AP operation amount. By the one-pedal function, the traveling control unit 113 may hold the stop state of the vehicle 100 after the stop without depending on the BP operation amount. For example, the traveling control unit 113 gives a braking force according to the AP operation amount to the vehicle 100 when the AP operation amount falls within the range of 0% to 30%, and gives a driving force according to the AP operation amount to the vehicle 100 when the AP operation amount falls within the range of 30% to 100%. The AP operation amount as the boundary between the braking force and the driving force can be set within the range of, for example, 20% to 40%. The traveling control unit 113 may change the value of the boundary in accordance with the vehicle speed.

The effect degree of the braking force according to the AP operation amount can be set from a plurality of levels via the shift lever 157 or the paddle 158. For example, the effect degree of the braking force can be set to each level from level 0 (the braking force is zero) to the upper limit level. The settable upper limit level can change depending on the remaining amount of the battery 133, the temperature of the battery 133, the temperature of the brake pad, the rotation speed of the engine 121, the rotation sped of the transmission 122, and the like. The maximum value of the upper limit level is, for example, level 6. The traveling control unit 113 may change the setting of the effect degree of the braking force not only in accordance with an instruction from the driver but also automatically without an instruction from the driver.

A one-pedal switch 162 is a switch used by the driver to perform switching between the enable state and the disable state of the one-pedal function. This switch may be formed by a physical button, or may be formed by a virtual button displayed on a touch panel. The one-pedal switch 162 is arranged on, for example, an instrument panel.

In a state in which the one-pedal function is disabled, the traveling control unit 113 may execute a paddle shift function. The paddle shift function is a function of changing, in accordance with an instruction from the driver via the shift lever 157 or the paddle 158, the effect degree of the braking force of the vehicle 100 in a case in which the AP operation amount is equal to or less than a traveling resistance. The effect degree of the braking force is changed by, for example, switching the change gear ratio of the transmission 122, adjusting the regeneration amount of the motor mechanism 130, adjusting the engine braking amount, or adjusting a pressure on the brake pad.

The effect degree of the braking force during the enable state of the paddle shift function can be set from a plurality of levels via the paddle 158. For example, the effect degree of the braking force can be set to each level from level 0 (the braking force is zero) to the upper limit level. The settable upper limit level can change depending on the charge state of the battery 133, and the like. The maximum value of the upper limit level is, for example, level 4. The traveling control unit 113 may change the setting of the effect degree of the braking force not only in accordance with an instruction from the driver but also automatically without an instruction from the driver.

A paddle shift switch 163 is a switch used by the driver to perform switching between the enable state and the disable state of the paddle shift function. This switch may be formed by a physical button, or may be formed by a virtual button displayed on a touch panel. The paddle shift switch 163 is arranged on, for example, the instrument panel.

The traveling control unit 113 may be able to execute an automatic brake hold function. The automatic brake hold function is a function of, in a case in which the vehicle 100 is stopped by depressing the brake pedal 152, holding the stop state of the vehicle 100 without depending on the BP operation amount after that (even if the foot is separated from the brake pedal 152). In the enable state of the automatic brake hold function, even if the driver separates the foot from the brake pedal 152 during the stop of the vehicle 100, the stop state of the vehicle 100 is held. The stop state is canceled when the driver depresses the accelerator pedal 150 to change the AP operation amount to a positive value.

An automatic brake hold switch 164 is a switch used by the driver to perform switching between the enable state and the disable state of the automatic brake hold function. This switch may be formed by a physical button, or may be formed by a virtual button displayed on a touch panel. The automatic brake hold switch 164 is arranged on, for example, the instrument panel.

A parking switch 165 is a switch used by the driver to instruct the start and end of actuation of the electric parking brake 142. This switch may be formed by a physical button, or may be formed by a virtual button displayed on a touch panel. The parking switch 165 is arranged on, for example, the instrument panel.

The traveling control unit 113 exclusively executes the automatic brake hold function and the one-pedal function. That is, both the automatic brake hold function and the one-pedal function are never enabled simultaneously. In addition, the traveling control unit 113 exclusively executes the paddle shift function and the one-pedal function. That is, both the paddle shift function and the one-pedal function are never enabled simultaneously.

A display device 166 is a device configured to present visual information to the driver. The display device 166 is formed by, for example, a liquid crystal display, an LED, a meter, or the like. An acoustic device 167 is a device configured to present auditory information to the driver. The acoustic device 167 is formed by, for example, a speaker. The display device 166 and the acoustic device 167 are arranged on, for example, the instrument panel. In this specification, notifications to the driver include a notification using only visual information, a notification using only auditory information, and a notification using both visual information and auditory information. For example, when notifying the driver of a message, the output control unit 114 may display the message as visual information on the display device 166, may reproduce the message as auditory information by the acoustic device 167, or may make both notifications.

Figure 2:
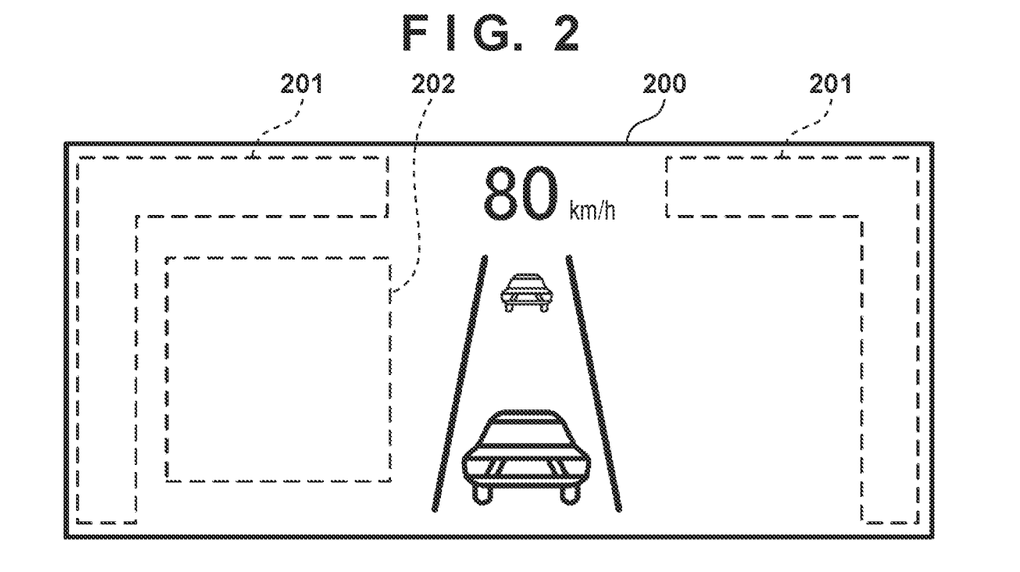
FIG. 2 is a schematic view for explaining an example of the arrangement of a screen according to the embodiment of the present invention.

An example of a screen 200 displayed on the display device 166 will be described with reference to FIG. 2. The screen 200 includes an indicator display region 201 and a message display region 202. Various indicators concerning the state of the vehicle are displayed in the indicator display region 201. A message to the driver is displayed in the message display region 202. In the example shown in FIG. 2, the indicator display regions 201 are arranged on both the left and right sides along the edge of the screen 200.

Examples of indicators that the output control unit 114 can display on the display device 166 will be described with reference to FIGS. 3A to 3D. Each of regions 301 and 302 shown in FIGS. 3A to 3D is a region used to display one indicator, and occupies part of the indicator display region 201. The region 301 and the region 302 may be adjacent to each other. Here, "two regions are adjacent" means that a region used to display another indicator does not exist between the two regions.

Figure 3A:
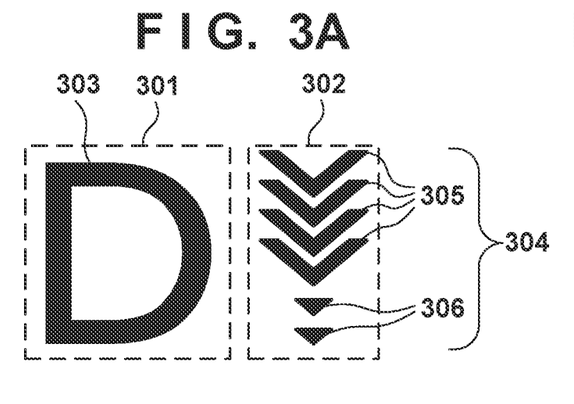
FIGS. 3A to 3D are views for explaining examples of display of indicators according to the embodiment of the present invention.
Figure 3B:
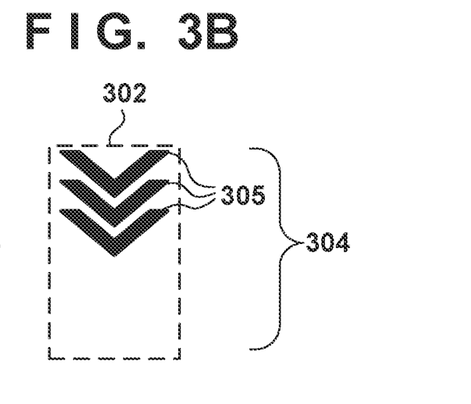

A shift position indicator 303 shown in FIG. 3A is an indicator representing the input position of the shift lever 157. The shift position indicator 303 is arranged in the region 301. For example, if the position of the shift lever 157 is "drive", a mark imitating the shape of "D" is displayed as the shift position indicator 303. If the position of the shift lever 157 is "neutral", "parking", or the like, a mark imitating the shape of "N", "P", or the like is displayed.

A braking force indicator 304 is an indicator representing the upper limit of the settable level of the effect degree of the braking force by the traveling control unit 113 and also representing the current set level of the effect degree of the braking force by the traveling control unit 113. When the upper limit of the settable level and the current set level are shown by the one braking force indicator 304 in this way, simple display is possible. The braking force indicator 304 is arranged in the region 302. The traveling control unit 113 may set the effect degree of the braking force to be given to the vehicle 100 in accordance with an instruction from the driver, or may set the effect degree automatically in accordance with the state of the vehicle 100. The traveling control unit 113 can receive a change instruction of the current set level of the effect degree from the driver via the paddle 158. The output control unit 114 displays the braking force indicator in each of a case in which the one-pedal function is enabled and a case in which the paddle shift function is enabled.

The braking force indicator 304 is formed by two types of marks 305 and 306. The mark 305 is larger than the mark 306. The number of marks 305 included in the braking force indicator 304 represents the current set level of the effect degree. The sum of the number of marks 305 included in the braking force indicator 304 and the number of marks 306 included in the braking force indicator 304 represents the upper limit of the settable level of the effect degree. In the example shown in FIG. 3A, since there are four marks 305, the current set level is level 4. In addition, since there are two marks 306, the upper limit of the settable level is level 6.

Figure 3C:
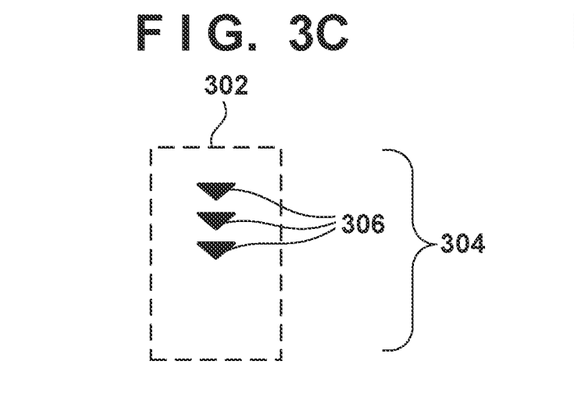
Figure 3D:
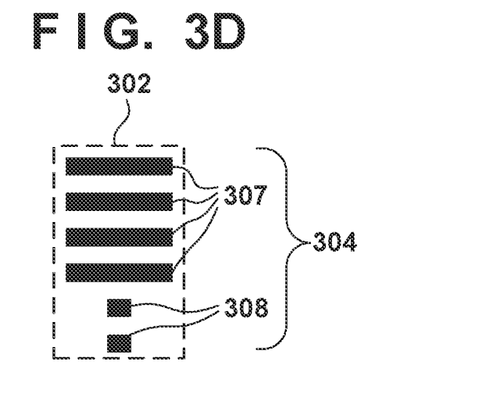

At least one of the mark 305 and/or the mark 306 may be 0 in number. For example, in FIG. 3B, the number of marks 305 is 3, and the number of marks 306 is 0. This shows that the upper limit of the settable level matches the current set level that is level 3. In FIG. 3C, the number of marks 305 is 0, and the number of marks 306 is 3. This shows that the upper limit of the settable level is level 3, and the current set level is level 0. If the current set level lowers, the display of the mark 305 ends from the lowermost side. The mark 305 that is not displayed anymore is replaced with the mark 306. If the upper limit of the settable level lowers, the display of the mark 306 ends from the lowermost side.

At least one of the mark 305 and/or the mark 306 may have a shape representing a direction in which the display of the mark is added. In the examples shown in FIGS. 3A to 3C, both the mark 305 and the mark 306 have a shape representing a direction in which the display of the marks is added. More specifically, the mark 305 has a shape representing a downward direction. This shows that when the current set level increases, the display of the mark 305 is added in the downward direction represented by the mark 305 (that is, the display of the mark 305 is added at the position of the mark 306 on the upper side in the two marks 306). This also applies to the mark 306. At least one of the mark 305 and/or the mark 306 may have a shape that does not represent a direction, like marks 307 and 308 shown in FIG. 3D.

Figure 4:
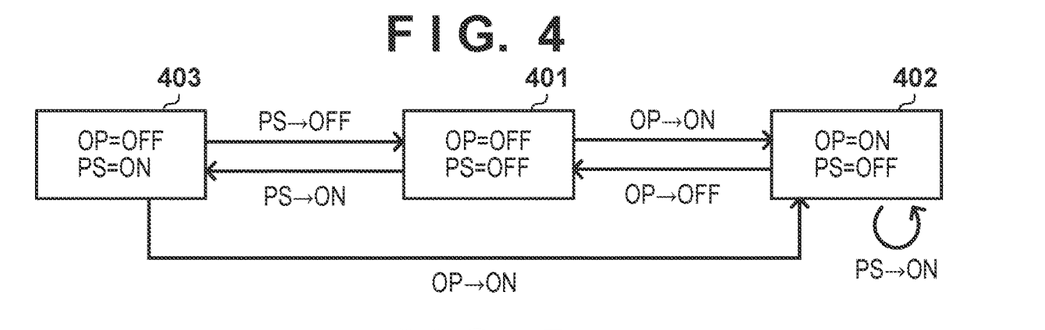
FIG. 4 is a state transition diagram for explaining the operation of a control device according to the embodiment of the present invention.

An example of control of the one-pedal function and the paddle shift function by the control device 110 will be described with reference to FIG. 4. In the states shown in FIG. 4, "OP" represents the state of the one-pedal function. "PS" represents the state of the paddle shift function. "ON" represents that the target function is enabled. "OFF" represents that the target function is disabled.

Each state will be described first. In a state 401, the one-pedal function is disabled, and the paddle shift function is disabled. In a state 402, the one-pedal function is enabled, and the paddle shift function is disabled. In a state 403, the one-pedal function is disabled, and the paddle shift function is enabled.

The state transition will be described next. In the state 401, upon receiving an instruction to enable the one-pedal function from the driver, the traveling control unit 113 transitions to the state 402. In the state 401, upon receiving an instruction to enable the paddle shift function from the driver, the traveling control unit 113 transitions to the state 403.

In the state 402, upon receiving an instruction to disable the one-pedal function from the driver, the traveling control unit 113 transitions to the state 401. The traveling control unit 113 may impart a predetermined condition to the transition. For example, the traveling control unit 113 may perform this transition upon receiving an instruction to disable the one-pedal function in a state in which the BP operation amount is positive, and may remain in the state 402 otherwise.

In the state 402, upon receiving an instruction to enable the paddle shift function from the driver, the traveling control unit 113 remains in the state 402. In this case, the output control unit 114 notifies the driver that it is impossible to enable the paddle shift function. This notification is made by, for example, displaying a message in the message display region 202. If transition from a state in which the one-pedal function is enabled to a state in which the paddle shift function is enabled can occur, the one-pedal function is disabled, and therefore, the braking force given to the vehicle 100 lowers. For this reason, the traveling control unit 113 does not perform such transition. Additionally, if transition is simply inhibited, the driver cannot grasp the situation. Hence, the output control unit 114 notifies a message representing this.

In the state 403, upon receiving an instruction to enable the one-pedal function from the driver, the traveling control unit 113 transitions to the state 402. In the state 403, upon receiving an instruction to disable the paddle shift function from the driver, the traveling control unit 113 transitions to the state 401.

Figure 5:
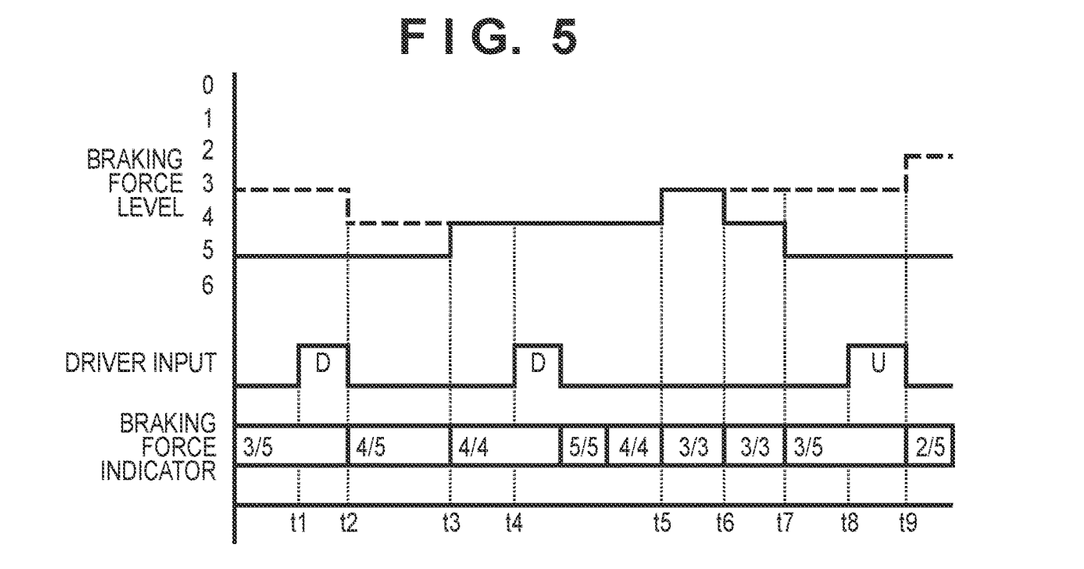
FIG. 5 is a timing chart for explaining the operation of the control device according to the embodiment of the present invention.

An example of processing by the control device 110 will be described with reference to FIG. 5. Referring to FIG. 5, "braking force level" represents the level of the effect degree of the braking force by the traveling control unit 113. A solid line represents the upper limit of the settable level of the braking force, and a broken line represents the current set level. Only the solid line is shown when the two lines overlap. "Driver input" represents a change instruction of the braking force level from the driver. "D" represents shift down (that is, a change instruction to raise the braking force level), and "U" represents shift up (that is, a change instruction to lower the braking force level). "Braking force indicator" represents the display contents of the braking force indicator 304 in a fraction form. The numerator represents the display contents of the current set level, and the denominator represents the upper limit of the settable level.

At the start point in FIG. 5, the traveling control unit 113 sets the current set level to level 3, and sets the upper limit of the settable level to level 5. Accordingly, the output control unit 114 displays the braking force indicator 304 in which the current set level is level 3, and the upper limit of the settable level is level 5.

At time t1, the driver instructs shift down. Since the current set level is lower than the upper limit of the settable level, the traveling control unit 113 accordingly changes the current set level to level 4 at time t2. Furthermore, the output control unit 114 displays the braking force indicator 304 in which the current set level is level 4, and the upper limit of the settable level is level 5. Simultaneously, the output control unit 114 may notify the driver that the current set level is changed. This notification is made by, for example, displaying a message in the message display region 202.

At time t3, the traveling control unit 113 changes the upper limit of the settable level to level 4 based on a change in the state of the vehicle 100. Accordingly, the output control unit 114 displays the braking force indicator 304 in which the current set level is level 4, and the upper limit of the settable level is level 4. Furthermore, the output control unit 114 may notify the driver that the upper limit of the settable level is changed. This notification is made by, for example, displaying a message in the message display region 202 or outputting auditory information by the acoustic device 167.

At time t4, the driver instructs shift down. Since the current set level is equal to the upper limit of the settable level, the traveling control unit 113 maintains the current set level at level 4. The output control unit 114 temporarily (for example, five sec) displays the braking force indicator 304 in which the current set level is level 5, and the upper limit of the settable level is level 5, and then displays the braking force indicator 304 in which the current set level is level 4, and the upper limit of the settable level is level 4. When the braking force indicator 304 according to the driver input is temporarily displayed in this way, the driver can grasp that the shift down instruction is accepted but cannot be set. Furthermore, if the current set level cannot be changed according to the change instruction from the driver, the output control unit 114 may blink the braking force indicator 304 (an indicator representing 5/5). In addition, the output control unit 114 may notify the driver that the current set level cannot be changed according to the change instruction from the driver. This notification is made by, for example, displaying a message in the message display region 202 and/or outputting auditory information by the acoustic device 167.

At time t5, the traveling control unit 113 changes the upper limit of the settable level to level 3 based on a change in the state of the vehicle 100, and also sets the current set level to level 3. Accordingly, the output control unit 114 displays the braking force indicator 304 in which the current set level is level 3, and the upper limit of the settable level is level 3. If the current set level is changed without depending on a change instruction from the driver, the output control unit 114 may blink the braking force indicator 304 (an indicator representing 3/3). Furthermore, the output control unit 114 may notify the driver that the current set level is changed without depending on a change instruction from the driver. This notification is made by, for example, displaying a message in the message display region 202 and/or outputting auditory information by the acoustic device 167.

At time t6, the traveling control unit 113 changes the upper limit of the settable level to level 4 based on a change in the state of the vehicle 100. Since the upper limit (level 4) after the change is equal to the upper limit (level 4 from time t3 to time t5) immediately before the change, the output control unit 114 maintains the display contents of the upper limit in the braking force indicator 304 at level 3. When the display contents are maintained in this way, it is possible to suppress an excessive change of the display contents.

At time t7, the traveling control unit 113 changes the upper limit of the settable level to level 5 based on a change in the state of the vehicle 100. Since the upper limit (level 5) after the change is different from the upper limit (level 3 from time t5 to time t6) immediately before the change, the output control unit 114 displays the braking force indicator 304 in which the current set level is level 3, and the upper limit of the settable level is level 5.

At time t8, the driver instructs shift up. Accordingly, the traveling control unit 113 changes the current set level to level 2 at time t9. Furthermore, the output control unit 114 displays the braking force indicator 304 in which the current set level is level 2, and the upper limit of the settable level is level 5.

In the above-described operation, if the current set level is changed, the output control unit 114 may notify the driver of the change. This notification is made by, for example, displaying a message in the message display region 202. The output control unit 114 may perform only message display when the current set level becomes high, and may reproduce a warning sound in addition to the message display when the current set level becomes low. In general, when the current set level becomes low, the output control unit 114 may make a strong notification as compared to a case in which the current set level becomes high. This calls the driver's attention because it is difficult for the vehicle 100 to decelerate as the intensity of the braking force lowers.

SUMMARY OF EMBODIMENT

[Arrangement 1]
There is provided a control device (110) configured to control a vehicle (100), the device comprising:
a traveling control unit (113) configured to set an effect degree of a braking force to be given to the vehicle; and
an output control unit (114) capable of displaying, on a display device (166) of the vehicle, an indicator (304) representing an upper limit of a settable level of the effect degree.

According to this arrangement, the driver can grasp the settable level of the braking force, and the safety in braking can be improved.

[Arrangement 2]
There is provided the control device according to arrangement 1, wherein the indicator further represents a current set level of the effect degree of the braking force by the traveling control unit.

According to this arrangement, it is possible to simply display the effect degree of the braking force.

[Arrangement 3]
There is provided the control device according to arrangement 2, wherein the number of first marks (305) included in the indicator represents the current set level, and
a sum of the number of first marks and the number of second marks (306) included in the indicator represents the upper limit.

According to this arrangement, it is possible to intuitively grasp the effect degree of the braking force by the number. In addition, since the space of the display device can be ensured, the driver can easily grasp other display contents.

[Arrangement 4]
There is provided the control device according to arrangement 3, wherein at least one of the first mark and/or the second mark has a shape representing a direction in which display of the mark is added.

According to this arrangement, it is possible to easily grasp the increase/decrease direction of the effect degree of the braking force.

[Arrangement 5]
There is provided the control device according to any one of arrangements 2 to 4, wherein the vehicle further comprises a paddle (158) configured to receive a change instruction of the current set level from a driver.

According to this arrangement, it is possible to easily change the effect degree of the braking force via the paddle.

[Arrangement 6]
There is provided the control device according to any one of arrangements 2 to 5, wherein if the current set level is changed without depending on a change instruction from a driver, the output control unit blinks the indicator.

According to this arrangement, it is possible to readily grasp the change of the current set level and improve the safety in braking.

[Arrangement 7]
There is provided the control device according to any one of arrangements 2 to 6, wherein if the current set level cannot be changed according to a change instruction from a driver, the output control unit blinks the indicator.

According to this arrangement, it is possible to readily grasp that the current set level cannot be changed and improve the safety in braking.

[Arrangement 8]
There is provided the control device according to any one of arrangements 2 to 5, wherein if the current set level is changed, the output control unit notifies a driver of the change.

According to this arrangement, it is possible to readily grasp the change of the current set level and improve the safety in braking.

[Arrangement 9]
There is provided the control device according to any one of arrangements 1 to 8, wherein the output control unit displays the indicator in a region (302) adjacent to a region (301) in which an indicator (303) representing an input position of a shift lever (157) is arranged.

According to this arrangement, it is possible to intuitively grasp that the effect degree of the braking force can be changed using the paddle based on the similarity between a character "D" and the shape of the paddle.

[Arrangement 10]
There is provided the control device according to any one of arrangements 1 to 9, wherein the output control unit displays the indicator in each of a case in which a one-pedal function of controlling both a driving force and the braking force of the vehicle in accordance with an operation amount of an accelerator pedal (150) is enabled, and a case in which a paddle shift function of, when the one-pedal function is disabled, changing the effect degree of the braking force without an accelerator operation in accordance with an instruction from a driver via one of a shift lever (157) and a paddle (158) is enabled.

According to this arrangement, it is possible to grasp the effect degree of the braking force using the same indicator in both the one-pedal function and the paddle shift function.

[Arrangement 11]
There is provided the control device according to any one of arrangements 1 to 10, wherein in a case in which the upper limit of the settable level is changed, if the upper limit after the change is equal to the upper limit immediately before the change, the output control unit maintains the display of the upper limit before the change.

According to this arrangement, it is possible to suppress an excessive change of display contents.

[Arrangement 12]

There is provided a method of controlling a vehicle (100), the method comprising:

setting an effect degree of a braking force to be given to the vehicle; and displaying, on a display device (166) of the vehicle, an indicator (304) representing an upper limit of a settable level of the effect degree.

According to this arrangement, the driver can grasp the settable level of the braking force.

[Arrangement 13]

There is provided a non-transitory computer-readable storage medium storing a program configured to cause a computer to function as each unit of a control device of any one of arrangements 1 to 11.

According to this arrangement, the present invention can be provided in a form of a storage medium.

What is claimed is:

1. A control device configured to control a vehicle, the device comprising:

a traveling control unit configured to set a strength level of regeneration brake to be provided by the vehicle in accordance with an instruction from a driver or a state of the vehicle; and an output control unit capable of displaying, on a display device of the vehicle, an indicator representing an upper limit of a settable strength level of regeneration brake and a current setting of the strength level of regeneration brake, wherein the upper limit of the settable strength level of regeneration brake is changed in accordance with a state of the vehicle, the number of first marks included in the indicator represents the current setting of the strength level of regeneration brake, a sum of the number of first marks and the number of second marks included in the indicator represents the upper limit of the settable strength level of regeneration brake, first mark is larger than the second mark, at least one of the first mark and/or the second mark has a shape representing a direction in which display of the mark is added, and the output control unit displays the indicator in a region adjacent to a region in which an indicator representing an input position of a shift lever is arranged.

2. The device according to claim 1, wherein the vehicle further comprises a paddle configured to receive a change instruction of the current setting of the strength level of regeneration brake from the driver.

3. The device according to claim 1, wherein if the current setting of the strength level of regeneration brake is changed without depending on a change instruction from the driver, the output control unit blinks the indicator.

4. The device according to claim 1, wherein if the current setting of the strength level of regeneration brake cannot be changed according to a change instruction from the driver, the output control unit blinks the indicator.

5. The device according to claim 1, wherein if the current setting of the strength level of regeneration brake is changed, the output control unit notifies the driver of the change.

6. The device according to claim 1, wherein the output control unit displays the indicator in each of a case in which a one-pedal function of controlling a driving force of the vehicle in accordance with an operation amount of an accelerator pedal falling within a first range and the braking force of the vehicle in accordance with the operation amount of the accelerator pedal falling within a second range is enabled, and a case in which a paddle shift function of, when the one-pedal function is disabled, changing the current setting of the strength level of regeneration brake without an accelerator operation in accordance with an instruction from the driver via one of a shift lever and a paddle is enabled.

7. The device according to claim 1, wherein in a case in which the upper limit of the settable strength level of regeneration brake is changed from a first level to a second level and then back to the first level, the output control unit displays the indicator representing the upper limit of the second level.

8. A method of controlling a vehicle, the method comprising:

setting a strength level of regeneration brake to be provided by the vehicle in accordance with an instruction from a driver or a state of the vehicle; and displaying, on a display device of the vehicle, an indicator representing an upper limit of a settable strength level of regeneration brake and a current setting of the strength level of regeneration brake, wherein the upper limit of the settable strength level of regeneration brake is changed in accordance with a state of the vehicle, the number of first marks included in the indicator represents the current setting of the strength level of regeneration brake, a sum of the number of first marks and the number of second marks included in the indicator represents the upper limit of the settable strength level of regeneration brake, the first mark is larger than the second mark, at least one of the first mark and/or the second mark has a shape representing a direction in which display of the mark is added, and the indicator is displayed in a region adjacent to a region in which an indicator representing an input position of a shift lever is arranged.

9. A non-transitory computer-readable storage medium storing a program configured to cause a computer to function as each unit of a control device of claim 1.

* * * * *